United States Patent [19]

Hunger et al.

[11] 4,056,522

[45] Nov. 1, 1977

[54] AZO COMPOUNDS DERIVING FROM 3-AMINO-4-LOWER CARBOALKOXY-BENZOIC ACID-4'-PHENOXY ANILIDES AND 2-HYDROXY-3-NAPHTHOIC ACID-4'-BENZOYLAMINO ANILIDES

[75] Inventors: Klaus Hunger, Kelkheim, Taunus; Friedrich Wilhelm Weingarten, Liederbach, Taunus, both of Germany

[73] Assignee: Hoechst Aktiengesellschaft, Frankfurt am Main, Germany

[21] Appl. No.: 686,031

[22] Filed: May 13, 1976

[30] Foreign Application Priority Data

May 15, 1975 Germany .............................. 2521655

[51] Int. Cl.$^2$ ............................................. C09B 29/20
[52] U.S. Cl. ....................................... 260/203; 560/45
[58] Field of Search ........................................ 260/203

[56] References Cited

U.S. PATENT DOCUMENTS

| 3,321,458 | 5/1967 | Lohe et al. | 260/203 |
| 3,509,124 | 4/1970 | Ronco et al. | 260/203 |
| 3,555,005 | 1/1971 | Ronco et al. | 260/203 X |

FOREIGN PATENT DOCUMENTS

| 1,156,577 | 7/1969 | United Kingdom | 260/203 |

*Primary Examiner*—Charles F. Warren
*Attorney, Agent, or Firm*—Curtis, Morris & Safford

[57] ABSTRACT

Diazotation of 3-amino-4-carboalkoxy-benzoic acid (4'-phenoxy)-anilides which may be halogenated in said phenoxy nucleus and coupling on 2-hydroxy-3-naphthoic acid-(4'-benzoylamino)-anilides which may be further substituted in said anilide nucleus by halogen, lower alkyl or lower alkoxy, yields azo compounds which are valuable pigments of clear shades and high fastness to migration, light and weather.

10 Claims, No Drawings

AZO COMPOUNDS DERIVING FROM 3-AMINO-4-LOWER CARBOALKOXY-BENZOIC ACID-4'-PHENOXY ANILIDES AND 2-HYDROXY-3-NAPHTHOIC ACID-4'-BENZOYLAMINO ANILIDES

This invention relates to azo compounds of the general formula I

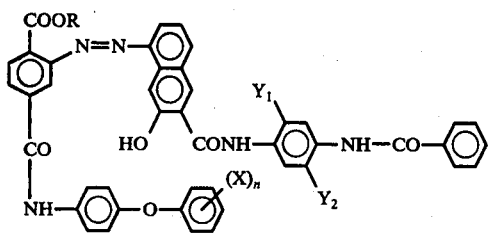

in which R is the methyl or ethyl group, X stands for identical or different halogen atoms, preferably chlorine or bromine, $Y_1$ and $Y_2$ which may be the same or different, each stands for hydrogen, chlorine or bromine atoms, methyl, ethyl, methoxy or ethoxy groups and n is zero or an integer of 1 to 4.

This invention also relates to a process for the preparation of the compounds of formula I, which comprises diazotizing amines of the general formula II

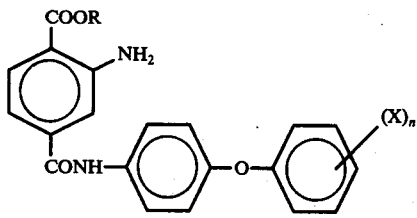

in which R, X and n are defined as above and coupling them on compounds of the general formula III

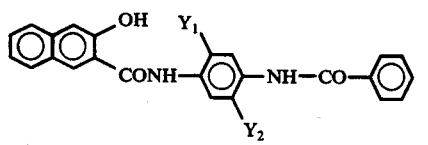

in which $Y_1$ and $Y_2$ are defined as above.

This invention also relates to the use of the compounds of formula I as pigments.

The amines of formula II may be prepared, for example, according to the Schotten-Baumann reaction from the known 3-nitro-4-carbalkoxy-benzoyl chlorides and the corresponding known 4-aminodiphenyl ether derivatives and by following reduction, preferably by catalytical hydrogenation.

Suitable amines of the formula II are, for example the methyl and ethyl esters of 2-amino-terephthalic acid-4-(4'-phenoxy)-anilides, the phenoxy radical of which may be substituted by 1, 2, 3 or 4 chlorine atoms or by a bromine atom.

The compounds of the formula III used as coupling components are easily accessible according to known methods, for example by the reaction of 2-hydroxy-3-naphthoic acid with the corresponding known 1-amino-4-benzoylaminobenzenes in a suitable solvent, for example chlorobenzene, toluene or pyridine in the presence of a condensation agent, for example phosphorus trichloride.

Suitable amino-4-benzoylaminobenzenes are, for example the 4-benzoylamino-derivatives of aniline, 2-methoxyaniline, 2,5-dimethoxy-aniline, 2-chloroaniline, 2,5-dichloroaniline, 2-methylaniline, 2,5-dimethylaniline, 2-chloro-5-methoxyaniline or 2-chloro-5-methylaniline.

The amines of the general formula II may be diazotized according to known methods, for example in a mineral acid with NO-yielding agents, for example sodium nitrite or nitrosylsulfuric acid.

The compounds of the formula I are prepared for example by combining the diazonium compounds with the coupling components in an aqueous medium. The reaction can be carried out such that the solution of the diazo compound is combined with the coupling component in a weakly acidic medium in the form of a fine dispersion or that the alkaline solution of the coupling component is poured into the solution of the diazo component adjusted to pH 5 to 6, e.g., by means of sodium acetate. Coupling may also be effected by pouring the solutions of the diazo and the coupling component together to a buffer mixture of, e.g., sodium acetate and acetic acid. Diazotization and following coupling may be carried out at temperatures within the range of from 0° to 80° C.

In all these operational methods, the presence of cation-active, anionic or non-ionic surface-active agents may be advantageous.

Diazotization and coupling may also be effected in the presence of suitable organic solvents, for example glacial acetic acid, alcohol, dioxane, formamide, dimethyl formamide, dimethyl sulfoxide, pyridine, methyl-isopropyl-ketone, methylisobutyl-ketone or N-methyl pyrrolidone.

The pigments of the invention are advantageously aftertreated at temperatures within the range of from 20° to 200° C, preferably 50° to 180° C. especially 80° to 150° C to obtain the optimum pigment form as to grain softness, color intensity, covering power and capability of processing in lacquers and synthetic materials.

To this effect, the coupling mixture is advantageously heated for some time, for example by boiling or keeping it under pressure at temperatures above 100° C, optionally in the presence of an organic solvent, such as ethanol, o-dichlorobenzene, dimethylformamide or in the presence of resin soap. The products of the invention yield especially pure pigments of high color intensity when the moist press cakes or the dried powders are subjected after coupling to a thermal aftertreatment with organic solvents, such as alcohols, pyridine, glacial acetic acid, dimethyl formamide, N-methylpyrrolidone, dimethyl sulfoxide, dichlorobenzene or nitrobenzene or the pigments are subsequently ground by adding grinding auxiliaries.

The organic solvents mentioned can act on the dried untreated pigment also in pure form or in mixture with one another.

The pigments may also be prepared in the presence of a carrier material, for example barium sulfate.

The compounds of the formula I are insoluble in water. They can be used for a great variety of pigment applications, for example for the preparation of printing pastes, of lacquers and dispersion paints or for dyeing caoutchouc, plastics or natural or synthetic resins. The pigments are also suitable for the pigment print on a substrate, especially on textile fibers, and on other flat-surface structures, for example paper. The pigments may also be used for example for dyeing rayon made of viscose or cellulose ethers or esters, of polyolefins, polyamides, polyurethanes, polyglycol terephthalates or polyacrylonitrile in the spinning mass or for dyeing paper.

The pigments can be processed very well in the above mediums. The dyeings show clear shades, good fastness to migration such as to bleeding, overlacquering and solvents, and especially good fastnesses to light and to weather.

German Pat. No. 1,644,191 (corresponding to U.S. Pat. No. 3,321,458) describes azo pigments which contain 2-hydroxy-3-naphthoyl-4'-benzoylamino-anilides as coupling components but differ in the diazo components from the compounds of this invention. Compared to the pigments of German Pat. No. 1,644,191 the pigments of the present invention are especially distinguished by a superior fastness to light and to weather.

The following Examples illustrate the invention, the parts and percentages being by weight, unless stated otherwise. The ratio of parts by weight to parts by volume is that of the kilogram to the liter.

EXAMPLE 1

24 g of 4-(3'-amino-4'-carbomethoxy-benzoylamino)-diphenyl ether were partly dissolved at about 60° in 250 ml of glacial acetic acid. By adding 40 ml of hydrochloric acid (30%) temporary dissolution was followed by salt formation. The mixture was stirred for another 2 hours at room temperature.

At a temperature within the range of from 30° to 60° C diazotization followed by adding 12 g of 40% sodium nitrite solution. The mixture was suction-filtered after adding 2 g of kieselguhr.

The pale-brown diazonium salt solution obtained was added at 35° to 70° C to the coupling suspension prepared in the following manner:

25 g of 2'-hydroxy-3'-naphthoyl-4-benzoylamino aniline were dissolved in 650 ml of water, 350 ml of isopropanol and 66 ml of 33% sodium hydroxide solution and added to a buffer mixture of 600 ml of water, 80 ml of glacial acetic acid, 30 g of sodium acetate and 10 ml of a 10% aqueous solution of the reaction product from 1 mol of oleyl alcohol and 30 mols of ethylene oxide, whereby the coupling component was finely dispersed.

The pH value of the coupling medium was between 5.5 and 6. After coupling was completed, the mixture was heated to 90° C and that temperature was maintained for 1 hour. After cooling to 70° C, the mixture was suction-filtered. The residue was washed with hot water until neutral and free from salt. The residue contained about 75% of water. The pigment can be after-treated in the moist or dry state by heating with organic solvents.

109 g of filter residue (of about 25% strength) were mixed with 110 g of isobutanol and after-treated under pressure for 5 hours at 150° C with stirring. After cooling in 90° C the isobutanol was removed with steam whereby the phases were separated. The pigment was suction-filtered and dried at 60° C. A pigment was obtained having a soft grain, a good tinctorial strength, a good covering power and a high fastness to light and very good fastnesses to bleeding, overlacquering and solvents.

It was suitable for printing paper and for dyeing synthetic resins and plastics.

EXAMPLE 2

22 g of 2'-hydroxy-3'-naphthoyl-4-benzoylamino-2,5-dimethoxyaniline were dissolved in a mixture of 500 ml of water, 250 ml of isopropanol and 50 ml of sodium hydroxide solution (33%).

Into a buffer mixture of 100 ml of water, 100 g of 85% phosphoric acid, 120 ml of 33% sodium hydroxide solution and 10 ml of a 10% aqueous solution of the reaction product of 1 mol of oleyl alcohol and 30 mols of ethylene oxide were added at 50°-70° C simultaneously the dissolved coupling component and 0.05 mol of the diazonium salt solution of Example 1. During coupling, the pH value was about 6. After coupling being completed, the solution was heated to 90° C and that temperature was maintained for 1 hour. After cooling to 70° C the suspension was suction-filtered. After washing with water the filter residue contained about 25% of pigment.

102 g of filter residue were mixed with 124 g of chlorobenzene and after-treated under pressure for 5 hours at 150° C while stirring. The mixture was cooled. The chlorobenzene was removed with steam. The remaining aqueous pigment suspension was suction-filtered and dried at 60° C. A red pigment was obtained having a soft grain, a good tinctorial strength, a good hiding power, a high fastness to light and very good fastnesses to migration.

The pigment suited for dyeing and printing paper, for pigmenting high-molecular weight organic material, for example lacquers, printing pastes and plastics materials.

EXAMPLE 3

0.05 mol of the diazonium salt solution prepared according to Example 1 was buffered by adding 30 g of sodium acetate. To the buffered suspension were added 10 ml of a 10% aqueous solution of the reaction product of 1 mol of oleyl alcohol and 30 mols of ethylene oxide whereafter a solution of 19.8 g of 2'-hydroxy-3'-naphthoyl-4-benzoyl-amino-3-methylaniline in a mixture of 500 ml of water, 250 ml of isopropanol and 50 ml of 33% sodium hydroxide solution was added at a temperature of 40°-60° C. The pH was 5.5–6.

After coupling being completed, the mixture was heated to 90° C and that temperature was maintained for 1 hour. After cooling to 70° C the mixture was suction-filtered. The dried pigment ws treated with the 10-fold amount by weight of dimethyl formamide for 4 hours at 130° C. When worked into polyvinyl chloride, a lacquer or a printing paste, the dry pigment yielded red dyeings having very good fastnesses to light and to migration.

EXAMPLE 4

11.5 g of 4-(3"-amino-4"-carbomethoxybenzoylamino)-2',5'-dichlorodiphenyl ether were partly dissolved at about 60° C in 100 ml of glacial acetic acid. To the suspension 18 ml of 30% hydrochloric acid were added. To complete salt formation, the matter was stirred for 2 hours. At a temperature rising from 30°–60° C, the amine was diazotized with 40% sodium nitrite solution. The matter was suction-filtered after adding 1 g of kieselguhr.

After eliminating excess sodium nitrite with amidosulfonic acid, the diazonium salt solution was poured at a temperature rising from 35° to 70° C into the coupling component suspension which was obtained as follows:

9.5 g of 2'-hydroxy-3'-naphthoyl-4-benzoyl-aminoaniline were dissolved in a mixture of 300 ml of water, 150 ml of isopropanol and 26 ml of 33% sodium hydroxide solution. This solution was added to a buffer mixture of 300 ml of water, 32 ml of glacial acetic acid, 11 g of sodium acetate and 2 ml of a 10% aqueous solution of the reaction product of 1 mol of oleyl alcohol and 30 mols of ethylene oxide.

The after-treatment and working up were the same as described in Example 1.

Further pigments can be prepared according to Examples 1-4, e.g., those which are given in the following Table:

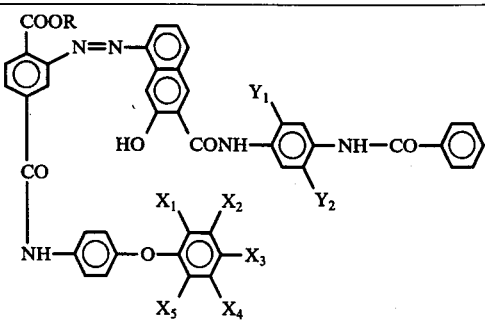

| Ex. | R | $X_1$ | $X_2$ | $X_3$ | $X_4$ | $X_5$ | $Y_1$ | $Y_2$ | Shade |
|---|---|---|---|---|---|---|---|---|---|
| 5 | $CH_3$ | H | H | Cl | H | H | H | H | yellowish red |
| 6 | $CH_3$ | Cl | H | H | Cl | H | $OCH_3$ | H | bluish red |
| 7 | $C_2H_5$ | Cl | H | Cl | H | H | H | H | red |
| 8 | $CH_3$ | Cl | Cl | H | H | H | Cl | H | red |
| 9 | $CH_3$ | Cl | H | Cl | Cl | H | H | H | yellowish red |
| 10 | $CH_3$ | H | H | Br | H | H | H | H | red |
| 11 | $C_2H_5$ | H | H | Cl | H | H | H | $CH_3$ | bluish red |
| 12 | $CH_3$ | H | H | H | H | H | H | $CH_3$ | bluish red |

The following Examples A-D show the preparation of selected diazo components of the formula II. Further diazo components are obtainable according to analogous processes:

EXAMPLE A

450 Parts of 3-nitro-4-carbomethoxybenzoic acid were dissolved in 1,000 parts by volume of chlorobenzene. The ester was made anhydrous by distilling off azeotropically about 100 parts by volume of chlorobenzene. By adding 10 parts by volume of dimethylformamide, which had been dried before, 260 parts (= 158 parts by volume) of thionyl chloride were added dropwise at 70° C. After 4-5 hours, excess thionyl chloride was removed together with slight amounts of chlorobenzene in a water jet vacuum. 374 Parts of 4-aminodiphenyl ether were dissolved at 80° C in 500 parts by volume of chlorobenzene and 160 parts by volume of pyridine. The acid chloride solution in chlorobenzene was introduced into that solution within 3 hours. The mixture was shortly heated to 100° C. The mixture was added to 4,000 parts by volume of 2% sodium carbonate solution. The product precipitated upon cooling. Chlorobenzene and pyridine were removed with steam. After suction-filtering and drying, the yield was 620 parts of the compound of the formula:

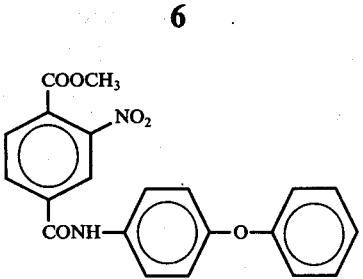

Melting point: 146°-148° C.

256 Parts of this 4-(3'-nitro-4'-carbomethoxybenzoylamino)-diphenyl ether were hydrogenated in 1,500 parts by volume of ethanol at 50° and 50 bar during 3 hours while adding 15 parts of nickel catalyst supported on kieselguhr. The hot solution was suction-filtered and in the filtrate the amine was carefully precipitated by adding water. Suction-filtering followed. After drying, the product of the formula

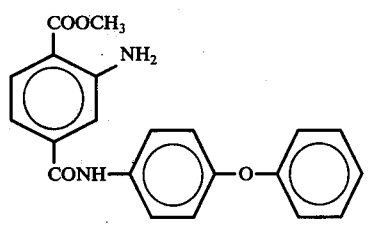

was recrystallized from ethanol, benzene or glacial acetic acid: yield: 70%, melting point: 172°-175° C.

EXAMPLE B

105 Parts of 4-amino-4'-chlorodiphenyl ether were dissolved in a mixture of 100 parts by volume of toluene and 50 parts by volume of pyridine at 70°-80° C. A solution of 122 parts of 3-nitro-4-carbomethoxybenzoyl chloride in chlorobenzene was added dropwise while stirring. The reaction was completed after about 4 hours. The reaction mixture was then added to 2,000 parts by volume of 2% sodium carbonate solution and toluene and pyridine were distilled off with steam. Yield after drysing: 190 parts, melting point: 134° C.

190 Parts of this 4-(3'-nitro-4'-carbomethoxy-benzoylamino)-4'-chlorodiphenyl ether were hydrogenated in 2,000 parts by volume of ethanol while adding 12 g of nickel catalyst (RCH 55/5 of Ruhrchemie) and 20 g of sodium acetate at 50° C and 70 bar within 3 hours.

After working up as described in Example A 134 parts of the compound of the formula

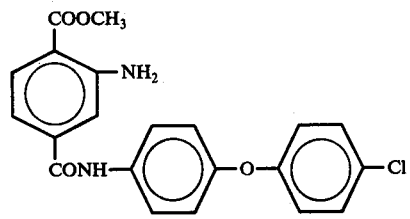

were obtained.
Melting point: 170°-175° C.

EXAMPLE C

At a temperature rising from 75°-120° C 67 parts of potassium hydroxide (86%) were gradually introduced while stirring into 171 parts of 2,5-dichlorophenol. To complete the reaction, the mixture was stirred for another 1–2 hours. At 90° C, 157 parts (= 125 parts by volume) of chloronitrobenzene were added dropwise during 2 hours during which operation the temperature could rise up to 135° C. After a total of 4 hours the content of the flask was poured into 500 parts by volume of 2% sodium hydroxide solution and that mixture was thoroughly stirred at 90° C for 1 hour. The upper aqueous layer was separated and washed several times with water. The mixture was cooled to 30°–40° C whereupon the product granulated and solidified. The washing water was adjusted to pH 1. The precipitated 4-nitro-2′,5′-dichlorophenyl ether was suction-filtered and can be recrystallized from ethanol (melting point: 96° C, yield: 88%).

150 Parts of iron filings were introduced into 400 parts by volume of glacial acetic acid. The mixture was heated to 80° C. 152 parts of the 4-nitro-2′,5′-dichlorodiphenyl ether were gradually introduced. The temperature was raised to 105°–110° C and thus the reduction was carried out.

After 3 hours the content of the flask was suction-filtered while hot. The same amount of water was added to the filtrate, whereupon the aminodiphenyl ether precipitated. It was separated by suction-filtering and dried (melting point: 72°–74° C).

70 Parts of 2′,5′-dichloro-4-aminodiphenyl ether were dissolved at 80° C in a mixture of 300 parts by volume of chlorobenzene and 30 parts by volume of pyridine. 70 parts of 3-nitro-4-carbomethoxybenzoyl chloride dissolved in chlorobenzene were added dropwise while stirring.

After about 4 hours, the condensation was completed. After cooling the reaction mixture to about 90° C it was added to 1,000 parts by volume of 3% sodium carbonate solution and chlorobenzene and pyridine were distilled off with steam.

Yield of nitro compound after drying: 76 parts, Melting point: 78° C.

37 Parts of this 4-(3″-nitro-4″-carbomethoxy-benzoylamino)-2′,5′-dichlorodiphenyl ether were introduced into 380 parts by volume of glacial acetic acid. The mixture was heated to 80° C. 38 parts of iron filings were introduced in the course of 1 hour. The temperature rose and was maintained at 105°–110° C during 3 hours. Working up was effected as described in Example B.

Yield: 30 parts of the compound of the formula

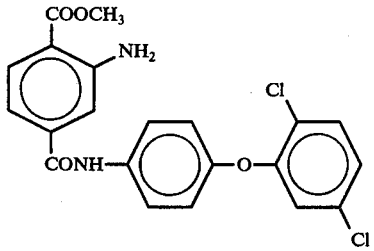

Melting point: 217° C.

EXAMPLE D

100 Parts of 2,4,5-trichlorophenol were melted at 80° C. 30 parts of potassium hydroxide were introduced at 80°–120° C during 2 hours while stirring. 81 parts (62.5 parts by volume) of 4-chloronitrobenzene were introduced dropwise at 90° C, the temperature being raised to 150° C at the end of the addition. The reaction was completed within 4–5 hours.

After cooling to 90° C the content of the flask was poured onto 500 parts by volume of 3% sodium hydroxide solution while stirring. The upper aqueous layer was separated. The mixture was stirred several times with water until it became neutral. The product granulated upon cooling to 30°–50° C. After acidifying to reach pH 1 the mixture was suction-filtered. Further purification could be effected by distillation under reduced pressure. After recrystallization from ethanol the nitro ether so obtained showed the melting point 103°–105° C; the yield was 120 parts.

140 Parts of 2′,4′,5′-trichloro-4-nitrodiphenyl ether were introduced in 800 parts by volume of ethanol. After heating the whole mixture to 50° C, 330 parts of iron filings were introduced, then 78 parts by volume of concentrated hydrochloric acid were added. The reduction was carried out within 5 hours. The mixture was neutralized with 32% aqueous ammonia, 1,200 parts by volume of ethanol were added and the mixture was concentrated under reduced pressure until crystallization began. The crystal suspension was introduced, while stirring, into 2,000 parts by volume of diluted hydrochloric acid until the reaction was strongly acid (pH 1–2). The mixture was suction-filtered and the filtrate was rendered alkaline, whereupon the amine precipitated. After cooling to 0°–10° C the mixture was suction-filtered and dried, then recrystallized from benzene. The 2′,4′,5′-trichloro-4-aminodiphenyl ether had the melting point 168° C.

28 Parts of 2′,4′,5′-trichloro-4-aminodiphenyl ether were dissolved at 80° C in a mixture of 200 parts by volume of chlorobenzene and 20 parts by volume of pyridine. 24 parts of 3-nitro-4-carbomethoxybenzoyl chloride dissolved in chlorobenzene were added dropwise while stirring.

After 4–5 hours the reaction was completed. At 90° C, the reaction mixture was added to 1,000 parts by volume of 2% sodium carbonate solution and chlorobenzene and pyridine were distilled off with steam.

Yield of nitro compound after drying: 34 parts.

100 Parts of tin(II)chloride (crystallized with 2 mols of water) were introduced at 100° C while heating into 300 parts by volume of concentrated hydrochloric acid and dissolved. 38 parts of 4-(3″-nitro-4″ carbomethoxybenzoylamino)-2′,4′, 5′-trichlorodiphenyl ether, dissolved in 200 parts by volume of ethanol, were added to that solution. After 2 hours the mixture was cooled and suction-filtered. The residue was introduced into 1,000 parts by volume of 6% potassium hydroxide solution, while stirring. The mixture was again suction-filtered and washed until neutral. The amine of the formula

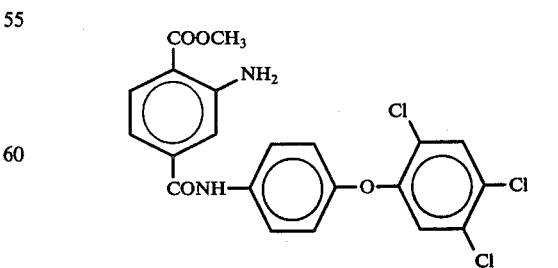

had a melting point of 198°–200° C after recrystallization from chlorobenzene.

We claim:

1. A compound of the formula

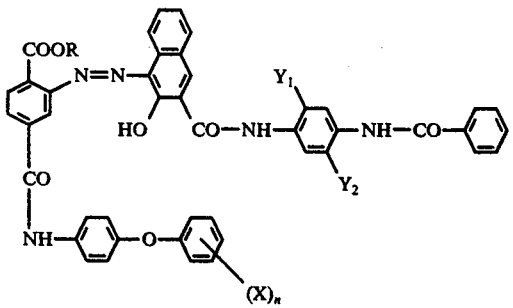

in which R is methyl or ethyl, X stands for equal or different halogen atoms, Y₁ and Y₂, which are equal or different, are hydrogen, chlorine, bromine, methyl, ethyl, methoxy or ethoxy and n is zero or an integer from 1 to 4.

2. A compound as claimed in claim 1, wherein X stands for chlorine or bromine.

3. A compound as claimed in claim 1, wherein R is methyl.

4. A compound as claimed in claim 1, wherein R is methyl and X is chlorine.

5. A compound as claimed in claim 1, wherein R is methyl, X is chlorine and Y₁ and Y₂ are hydrogen.

6. The compound as claimed in claim 5, wherein n is zero.

7. The compound as claimed in claim 5, wherein n is 3, the chlorine atoms standing in 2,4,5-positions.

8. The compound as claimed in claim 5, wherein n is 1, the chlorine standing in 4-position.

9. The compound as claimed in claim 5, wherein n is 2, the chlorine atom standing in 2,5-positions.

10. The compound as claimed in claim 3, wherein Y₁ is hydrogen, Y₂ is methyl and n is zero.

* * * * *